(12) United States Patent
Tseng et al.

(10) Patent No.: US 7,269,141 B2
(45) Date of Patent: Sep. 11, 2007

(54) DUPLEX AWARE ADAPTIVE PLAYOUT METHOD AND COMMUNICATIONS DEVICE

(75) Inventors: Kuo-Kun Tseng, Hsin-Chu (TW); Ying-Dar Lin, Hsin-Chu (TW)

(73) Assignee: Accton Technology Corporation, Hsin-Chu (TW)

( * ) Notice: Subject to any disclaimer, the term of this patent is extended or adjusted under 35 U.S.C. 154(b) by 1025 days.

(21) Appl. No.: 10/065,176

(22) Filed: Sep. 24, 2002

(65) Prior Publication Data
US 2004/0066751 A1 Apr. 8, 2004

(51) Int. Cl.
H04J 1/16 (2006.01)
H04J 3/16 (2006.01)
H04J 3/06 (2006.01)
H04L 5/16 (2006.01)

(52) U.S. Cl. ............... 370/252; 370/296; 370/352; 370/465; 370/517

(58) Field of Classification Search ........ 370/252, 370/293
See application file for complete search history.

(56) References Cited

U.S. PATENT DOCUMENTS

| | | | |
|---|---|---|---|
| 5,600,632 | A | 2/1997 | Schulman |
| 5,815,634 | A | 9/1998 | Daum et al. |
| 6,072,809 | A | 6/2000 | Agrawal et al. |
| 6,259,677 | B1 | 7/2001 | Jain |
| 6,735,192 | B1 * | 5/2004 | Fried et al. ............... 370/352 |
| 6,775,301 | B1 * | 8/2004 | Kroll et al. ............... 370/516 |
| 6,862,298 | B1 * | 3/2005 | Smith et al. ............... 370/516 |
| 6,977,942 | B2 * | 12/2005 | Raisanen ............... 370/429 |

(Continued)

FOREIGN PATENT DOCUMENTS

WO     WO 99/13608     * 3/1999

OTHER PUBLICATIONS

R. Ramjee, J. Kurose, D. Towsley, and H. Schulzrinne, "Adaptive Playout Mechanisms for Packetized Audio Applications in Wide-Area Networks", Proceedings of IEEE Infocom, Toronto, Canada, pp. 680-686, Jun. 1994.

(Continued)

Primary Examiner—Chau Nguyen
Assistant Examiner—Nittaya Juntima
(74) Attorney, Agent, or Firm—Winston Hsu

(57) ABSTRACT

A duplex aware adaptive playout method includes detecting a packet communication mode as either a full-duplex mode or a half-duplex mode, calculating a playout delay for a current packet based on the detected packet communication mode, and delaying playout of the current packet by the calculated playout delay. When the packet communication mode is detected to be the half-duplex mode, the calculated playout delay for the current packet is set longer than when the packet communication mode is detected to be the full-duplex mode. A duplex aware adaptive communications device includes a playout buffer, a playout controller, a network delay estimator, and an active detector that detects a packet communication mode. The playout controller determines playout delays of packets in the playout buffer from estimated network delays and a detected packet communication mode being a full-duplex mode or a half-duplex mode.

16 Claims, 3 Drawing Sheets

U.S. PATENT DOCUMENTS 7,023,821 B2 * 4/2006 Wotherspoon et al. ...... 370/329
2002/0075857 A1 * 6/2002 LeBlanc ...................... 370/352

OTHER PUBLICATIONS

Marco Rolletti, V Potorro Ghini, Giovanni Pau, Paola Salomoni, and Marta Elena Bonfigli, "Design and Experimental Evaluation of an Adaptive Playout Delay Control Mechanism for Packetized Audio for use over the Internet", Nov. 1998.

H. Schulzrinne, S. Cahner, R. Frederick, V. Jacobson, "RTP—A Transport Protocol for Real-time Applications", RFC 1889, Jan. 1996.

Jesus Pinto and Kenneth J. Christensen, "An Algorithm for Playout of Packet Voice based on Adaptive Adjustment of Talkspurt silence Periods" 1999.

Phillip Deleon and Carmac J. Sreerian, "An Adaptive Predictor for Media Playout buffering", Stanford, Mar. 2001.

* cited by examiner

DUPLEX AWARE ADAPTIVE PLAYOUT METHOD AND COMMUNICATIONS DEVICE

BACKGROUND OF INVENTION

1. Field of the Invention

The present invention relates to network data transmission, and more specifically, to optimizing a playout delay for packets transmitted in a network based on a duplex mode of real-time interactive communication.

2. Description of the Prior Art

The popularity of the Internet and wireless communications has lead to the development of technologies that allow real-time digital communication between people. Recently, communication through the Internet and wireless communications networks has been improved for new technologies such as voice over Internet protocol (VoIP) and the other real-time interactive communication systems.

One of the major obstacles in the communication of packets belonging to a network transmission, such as VoIP packets, is variance in network delay known as jitter. Jitter is typically reduced by delaying the playout of packets according to a playout delay. As network delay is not constant, reducing the amount of jitter in a transmission requires reasonable measurements of network delay and accurate estimations of playout delay. However, the playout delay cannot be too long, as the transmission is intended to be real-time and long playout delays defeat this intention. Minimizing playout delay is particularly important in two-way communications, such as through VoIP, wireless phones, videophones, or on-line games, to avoid delay related inconvenience to users when communicating to each other.

FIG. 1 is a schematic diagram that shows packets of data of a voice data 20 being sent across a network 10. For example, the data 20 can be media output from the Internet such as a VoIP transmission, a person's voice being transmitted across a wireless phone network, or similar communications data. The data 20 includes audible ranges 20a, 20c, and 20e where there is discernable audio information and silent ranges 20b and 20d where there is an absence of discernable audio information. A sender 12, being a PC, wireless telephone, or other device, sends packets P1-P15 in order at regular intervals, but because of network delay delaying the transmission of the packets P1-P15 some of the packets P1-P15 arriving at a receiver 14, a similar PC or device, must be further delayed by different amounts to form a cohesive voice data 22. The voice data 22 includes audible ranges 22a, 22c, and 22e and silent ranges 22b and 22d corresponding to the ranges 20a-20e of the sent data 20.

The packet P1 is sent by the sender 12 at a given time. The packet P1 is delayed by the network 10 for any number of reasons, said delay and further delays being indicated in FIG. 1 by a shaded block. The packet P1 is further delayed by the receiver 14 so it can be played contiguously with the packet P2 that is also delayed by the network 10. If the packet P1 is not further delayed by the receiver 14, packets P1 and P2 would not be played contiguously, and an audible break in the data 22 would occur. The audible break in the data 22 would be heard by a listener at the receiver 14, which translates to poor audio quality of the playout data 22.

The packets P2-P5 are all delayed by the network 10 by the same amount of time and do not have to be further delayed by the receiver 14 to be played in sequence with proper timing. However, the packet P7 arrives before the packet P6. The receiver 14 must delay the playout of the packet P7 until the packet P6 is received. This delay is added to the silent range 22b of the data 22 so that the audible range 22c is not affected. The packets P8 and P9 arrive simultaneously as do the packets P10 and P11 because of network delay and packet bursting. Playout of the packets P9 and P11 is accordingly delayed, however, no further delay of the data 22 results. The packets P13 and P14 suffer a similar disorder as the packets P6 and P7. The packets P12 and P15 arrive at the receiver 14 normally.

The above description with reference to FIG. 1 is a simplification. The packets P1-P15 were assumed to arrive at the receiver delayed by an integer multiple of their packet length. In reality, a substantially large number of packets in a given transmission must be delayed, as network delay and jitter are essentially continuous in time and packet length is digital.

FIG. 1 shows that the entire received data 22 is delayed by three blocks by a combination of network delay and additional playout delay added by the receiver 14. If this additional delay were not added by the receiver 14, some packets would be played out of order and others would not be played at all. The prior art teaches a number of ways to estimate the delay required to be added by the receiver 14. However, too much playout delay can result in inconvenience and even misunderstanding between parties in two-way schemes. A fundamental and arguably most useful method of estimating playout delay is the mean delay and variance (MDV) method described in R. Ramjee, J. Kurose, D. Towsley, and H. Schulzrinne, "Adaptive Playout Mechanisms for Packetized Audio Applications in Wide-Area Networks", Proceedings of IEEE INFOCOM, Toronto, Canada, pp. 680-686, June 1994, which is incorporated herein by reference. The MDV method is further described in Marco Roccetti, Vittorio Ghini, Giovanni Pau, Paola Salomoni, and Maria Elena Bonfigli, "Design and Experimental Evaluation of an Adaptive Playout Delay Control Mechanism for Packetized Audio for use over the Internet", November 1998, which is also incorporated herein by reference. Briefly, the MDV method estimates playout delay from a variance of a mean network delay in conjunction with a smoothing factor. This simple adaptive approach offers significant improvement over other non-adaptive approaches.

Another method of estimating playout delay is described in the real-time transport protocol (RTP) standard. H. Schulzrinne, S. Casner, R. Frederick, V. Jacobson, "RTP: A Transport Protocol for Real-Time Applications", RFC 1889, January 1996 details the RTP standard and is incorporated herein by reference. The RTP method of estimating delay is essentially the MDV method applied with a fixed smoothing factor. While simpler than the MDV method, the RTP method offers a less accurate estimation of network delay.

Other prior art methods of estimating playout delay include a spike detection method described in "Adaptive Playout Mechanisms for Packetized Audio Applications in Wide-Area Networks", and a related gap-based method described in Jesus Pinto and Kenneth J. Christensen, "An Algorithm for Playout of Packet Voice based on Adaptive Adjustment of Talkspurt Silence Periods", 1999. Both the spike detection method and the gap-based method offer little significant improvement over the MDV method at the expense of added complexity.

Finally, the prior art offers a normalized least mean square (NLMS) method that is described in Phillip DeLeon and Cormac J. Sreenan, "An Adaptive Predictor for Media Playout buffering", Stanford, March 2001. The NLMS is a complicated method that offers no readily apparent advantages over other methods.

In addition, the prior art has numerous patents relating to the playout of digital information and performance monitoring of the playout. For instance, Daum et al. teach stream synchronization for MPEG playback in the comprehensive U.S. Pat. No. 5,815,634, and Jain describes a real-time receiver and method for receiving and playing out real-time packetized data in U.S. Pat. No. 6,259,677, both of which are included herein by reference. Additionally, Schulman in U.S. Pat. No. 5,600,632 teaches performance monitoring in a network using synchronized network analyzers relating to packet delay, and Agrawal et al. provide a predictive approach to synchronization using a method for maintaining and updating statistical trends of network delay in U.S. Pat. No. 6,072,809, both of which are include herein by reference.

The prior art methods mentioned and described above optimize the playout delay from network statistics and do not adequately consider a duplex of communications. That is, playout delay is not adjusted considering half-duplex or full-duplex modes of communication. Thus, advantages of considering these modes are not realized resulting in actual playout quality, and therefore overall communications quality, being deteriorated.

SUMMARY OF INVENTION

It is therefore a primary objective of the claimed invention to provide a duplex aware adaptive playout method and communications device to optimize playout delay of packet communication to solve the problems of the prior art.

Briefly summarized, the claimed invention method includes detecting a packet communication mode as either a full-duplex mode or a half-duplex mode, calculating a playout delay for a current packet based on the detected packet communication mode, and delaying playout of the current packet by the calculated playout delay. When the packet communication mode is detected to be the half-duplex mode, the calculated playout delay for the current packet is set longer than when the packet communication mode is detected to be the full-duplex mode.

According to the claimed invention, the method is further capable of calculating a mean network delay variance for the current packet, and determining an estimated jitter for the current packet referencing the mean network delay variance. Then, the playout delay for the current packet is calculated further based on the estimated jitter of the current packet and playout delays of previous packets.

According to the claimed invention, a communications device includes a playout buffer that receives and buffers packets for playout, a playout controller that controls the playout buffer according to playout delays, a network delay estimator that calculates estimated network delays for the playout controller, and an active detector that detects a packet communication mode for the playout controller. The playout controller determines playout delays of packets from the estimated network delays and the detected packet communication mode. The packet communication mode can be a full-duplex mode or a half-duplex mode.

It is an advantage of the claimed invention that delaying playout of packets by a longer delay in the half-duplex mode improves playout quality.

It is an advantage of the claimed invention that delaying playout of packets by a shorter delay in the full-duplex mode accelerates playout response.

It is a further advantage of the claimed invention that the active detector can detect the communication mode and the playout controller can delay playout of packets according to the communication mode.

These and other objectives of the claimed invention will no doubt become obvious to those of ordinary skill in the art after reading the following detailed description of the preferred embodiment that is illustrated in the various figures and drawings.

DETAILED DESCRIPTION

The present invention duplex aware adaptive playout method is best understood when described in conjunction with a communications device. Notation is consistent between all equations and procedures given.

Figure 1:
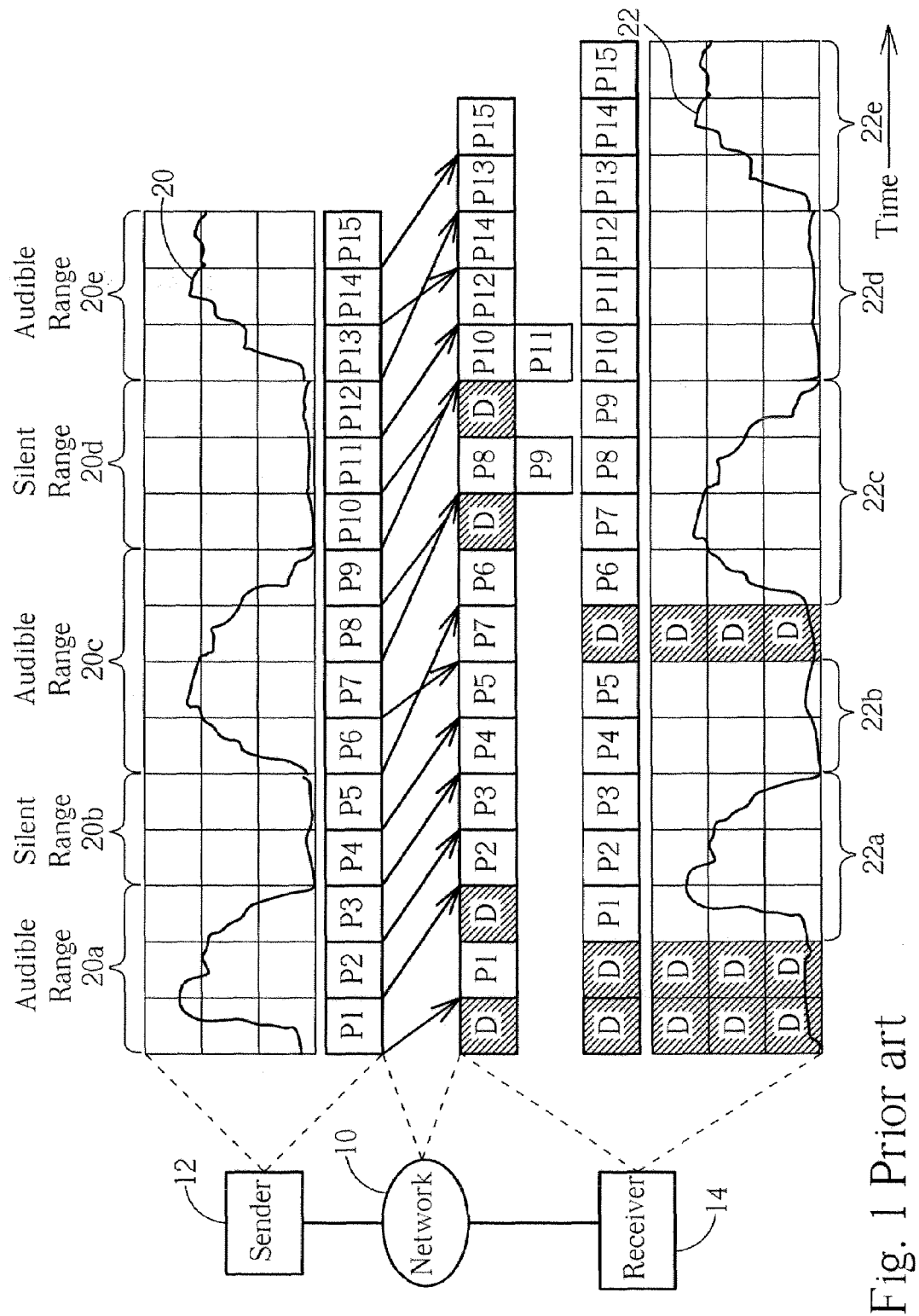
FIG. 1 is a schematic diagram showing packets of voice data being sent across a network.
Figure 2:
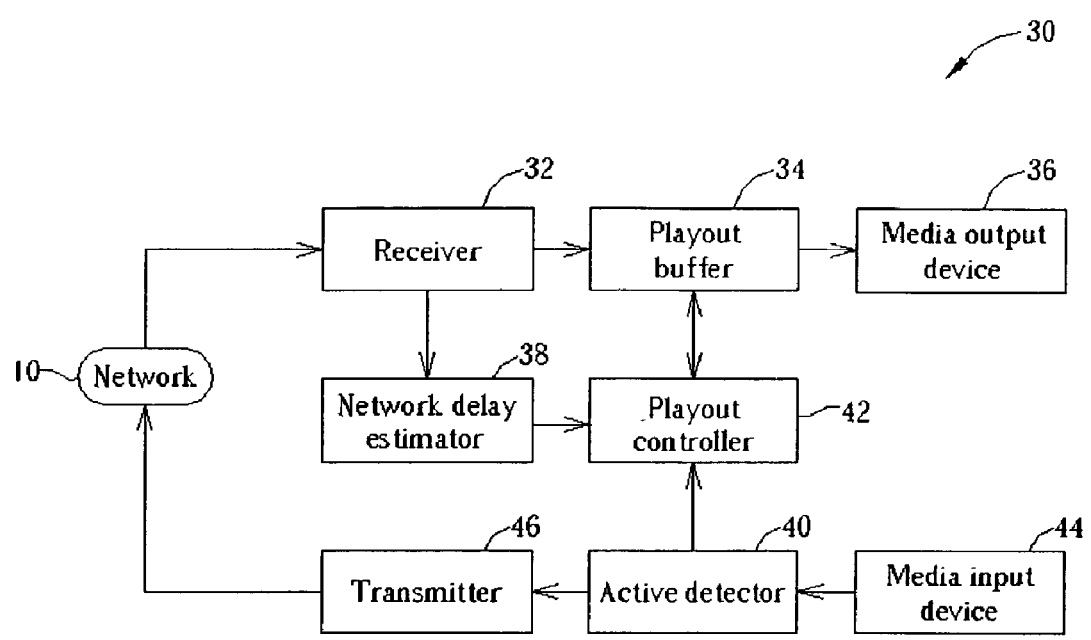
FIG. 2 is a block diagram of a communications device according to the present invention.

Please refer to FIG. 2. FIG. 2 shows system architecture of a communications device 30 according to the present invention. The communications device 30 comprises a receiver 32 for receiving packets from the network 10, and a playout buffer 34 for receiving packets forwarded by the receiver 32 and for outputting data of the packets to a media output device 36. The playout buffer 34 is used to absorb network jitter so playout of the packets at the media output device 36 is substantially smooth and continuous. The media output device 36 can be a typical media output device such as a voice over Internet protocol (VoIP) player, a speaker or display of a wireless telephone, or other such device. The playout device 30 further comprises a network delay estimator 38 for estimating network delay of the network 10, an active detector 40 for detecting a packet communication mode, and a playout controller 42 for controlling the playout buffer 34. The active detector 40 determines if the packet communication mode is a half-duplex mode, when a media input device 44 is inactive, or is a full-duplex mode, when the media input device 44 is active. The media input device 44, being a device corresponding to the media output device 36, accepts information input to the communications device 30 and forwards packets to a transmitter 46. The transmitter 46 outputs packets to the network 10. The playout controller 42 sets the delays of received packets in the playout buffer 34 according to network delay estimates from the network delay estimator 38 and the packet communication mode as determined by the active detector 40. Finally, when the playout delay of a packet expires, the playout buffer 34 sends the packet to the media output device 36 for playout.

The active detector 40 detects if the communications device 30 is in the half-duplex mode or the full-duplex mode. If the media input device 44 is not receiving information, or the amount of information is below a threshold (for example, voice volume is nearly silent), the active detector 40 detects that the communications device 30 is in the half-duplex mode. Conversely, when the media input device 44 is receiving information above the threshold, the full-duplex mode is detected. That is, the half-duplex mode is one-way communication and the full-duplex mode is two-way as is well understood in the art. Other methods of switching between the half-duplex and full-duplex modes are also possible in relation to the present invention.

The network delay estimator 38 and playout controller 42 estimate network delay and mean network delay variance according to the following equations:

$$D_i = |(R_i - R_{i-1}) - (S_i - S_{i-1})|$$

$$MD_i = F \times MD_{i-1} + (1-F) \times D_i$$

$$V_i = |MD_i - D_i|$$

$$MV_1 = F \times MV_{i-1} + (1-F) \times V_1 \quad \text{(Eqns. 1)}$$

where,

D is network delay;
R is a receiver timestamp;
S is a sender timestamp;
i is an index that denotes a current packet;
i−1 is an index that denotes a previous packet;
MD is mean network delay;
F is a smoothing factor;
V is network delay variance;
MV is mean network delay variance;

Essentially, the network delay estimator 38 first estimates a network delay for the current packet based on network statistics of the current packet and of the previous packets. The network delay estimator 38 then forwards the estimated network delay for the current packet to the playout controller 42. The playout controller 42 then calculates a mean network delay variance for the current packet using the mean network delay, the smoothing factor, and the network delay variance. The playout controller 42 then calculates a playout delay for the current packet according to the packet communication mode, wherein FULL_DUPLEX and HALF_DUPLEX are valid values, an estimated network jitter, a full-duplex scalina factor (FSF), a full-duplex smoothing factor (FF), a half-duplex scalina factor (HSF), and a half-duplex smoothing factor (HF).

The playout controller 42 first determines the mode of packet communication, then determines the network jitter, and finally calculates the playout delay for the current packet. The determined network jitter depends on the network delay variance of Eqns. 1, a scaling factor. The playout delay depends on the jitter measurement for the current packet, a smoothing factor, and the actual playout delays for the previous packets. The playout controller 42 selects the scaling and smoothing factors depending on the mode of packet communication, either FULL_DUPLEX or HALF_DUPLEX, as determined by the active detector 40.

For optimum performance, the half-duplex scaling factor HSF is set larger than the full-duplex scaling factor FSF. The reason being a longer playout delay is permissible in half-duplex mode, and is conducive to higher playout quality. For example, if one person is talking and another person is listening (i.e. for one communications device 30 the media input device 44 is inactive) increased playout delay simply results in improved playout quality for the listener. On the contrary, in full-duplex mode, playout delay is minimized (low FSF value relative to HSF) as much as practically possible without unduly sacrificing playout quality to allow smooth simultaneous communication between more than one communications device 30. In full duplex mode, when both people are speaking and listening at the same time, short playout delay is important for communication effectiveness. In full-duplex mode, playout quality is exchanged for shorter playout delay. More to this point, the full-duplex smoothing factor FF is set larger than the half-duplex smoothing factor HF to provide more rapid adjustment of playout delay required by the communications device 30 in full-duplex mode. This causes the playout delay to depend more on the actual current estimated network jitter and less on the playout delays of the previous packets or playout history, thus giving the full-duplex mode relatively quick response. The values of the scaling factors HSF and FSF and the smoothing factors HF and FF are set by and stored in the playout controller 42.

Figure 3:
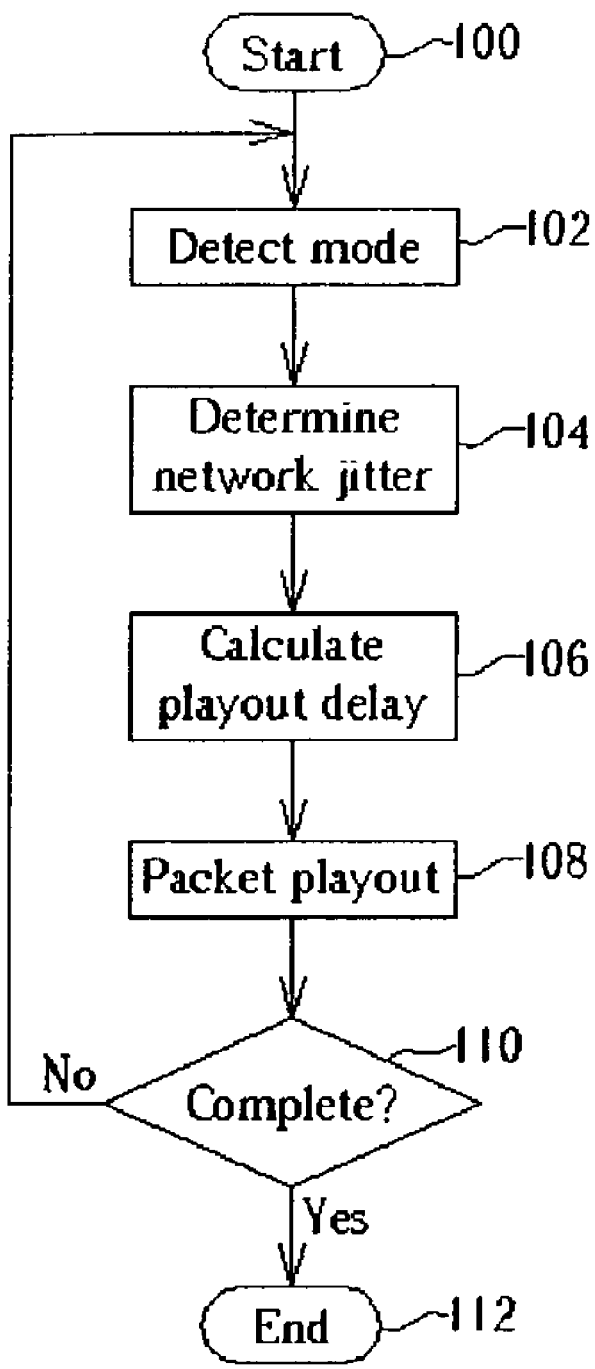
FIG. 3 is a flowchart of operation of the communications device according to the present invention.

In practical application, the playout device 30 and its constituent components can be realized using conventional electronic circuits, integrated circuits, and related software programs. The logic and programming of the playout controller 42 and the network delay estimator 38, and response and thresholds of the active detector 40 can be fine-tuned and designed to suit any relevant communications application. Such applications include VoIP players, videophones, on-line games, and the other real-time interactive communication devices for the Internet and wireless networks. The previously described process for optimizing playout delays of packets performed by the communications device 30 can be summarized with reference to the flowchart of FIG. 3 that is described as follows:

Step 100:
Start. Two (or more) communications devices 30 are communicating through the network 10;

Step 102:
The active detector 40 detects the mode of packet communication as full-duplex or half-duplex;

Step 104:
The network delay estimator 38 and the playout controller 42 determine network jitter for the current packet being received at the receiver 32. Procedures in accordance with Eqns. 1 are executed;

Step 106:
The playout controller 42 calculates the playout delay of the current packet according to the detected mode of step 102 and the estimated network delay of step 104, and forwards the playout delay of the current packet to the playout buffer 34. The procedure of calculating the playout delay for the current packet is performed. The playout delay for the current packet is stored in the playout controller 42 for use in a future execution of this procedure (FIG. 3) for a next packet;

Step 108:
The media output device 36 delays playout of packets in the playout buffer 34 according to the playout delays;

Step 110: Is communications complete? If not, return to step 102. If it is, go to step 112;

Step 112: End.

In practical application, the above procedure is performed continuously by each connected communications device 30 in the network 10. As each communications device 30 delays playout of received packets according to the duplex, overall communications quality is improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for optimizing a playout delay of packets being transmitted within a network, said packets comprising data for playout, said network having a network delay of packet transmission, the method comprising:

(a) detecting a packet communication mode, wherein packet communication modes comprise a full-duplex mode and a half-duplex mode;

(b) calculating a playout delay for a current packet based on the detected packet communication mode and the playout delays of previous packets; and (c) delaying playout of the current packet by the calculated playout delay.

2. The method of claim 1 wherein in (b) when the packet communication mode is detected to be the half-duplex mode, the calculated playout delay for the current packet is longer than when the packet communication mode is detected to be the full-duplex mode.

3. The method of claim 1 further comprising:

(d) calculating a mean network delay variance for the current packet; and (e) determining an estimated jitter for the current packet referencing the mean network delay variance;

wherein in (b) the playout delay for the current packet is calculated further based on the estimated jitter for the current packet and playout delays of previous packets.

4. The method of claim 3 wherein in (b) when the packet communication mode is detected to be the half-duplex mode, the calculated playout delay for the current packet depends more on the playout delays of the previous packets than when the packet communication mode is detected to be the full-duplex mode.

5. The method of claim 3 wherein in (b) when the packet communication mode is detected to be the half-duplex mode, the calculated playout delay for the current packet depends less on the estimated jitter for the current packet than when the packet communication mode is detected to be the full-duplex mode.

6. The method of claim 3 wherein the estimated jitter for the current packet as determined in (e) further depends on a scaling factor that is set according to the packet communication mode as detected in (a).

7. The method of claim 3 wherein calculating a playout delay for the current packet in (b) further references a smoothing factor that is set according to the packet communication mode as detected in (a).

8. The method of claim 1 wherein the playout of the packets is for a voice over Internet protocol (VoIP), videophone, on-line game, and other real-time interactive communication.

9. The method of claim 1 wherein the network is a computer network or a radio transmission network for wireless phones.

10. A communications device for playing data contained in packets with an optimized delay, said packets comprising data for playout, said network having a network delay of packet transmission, the playout device comprising:

a playout buffer for receiving and buffering packets;

a playout controller for determining playout delays of current packets from estimated network delays, playout delays of previous packets, and a packet communication mode, and for controlling the playout buffer according to the playout delays;

a network delay estimator for calculating estimated network delays of packets and sending estimated network delays to the playout controller; and an active detector for detecting the packet communication mode, wherein packet communication modes comprise a full-duplex mode and a half-duplex mode.

11. The communications device of claim 10 wherein when the active detector detects the packet communication mode is the half-duplex mode, the playout controller calculates a playout delay for a current packet as longer than when the active detector detects the packet communication mode is the full-duplex mode.

12. The communications device of claim 10 wherein when the active detector detects the packet communication mode is the half-duplex mode, the playout controller calculates a playout delay for a current packet as depending more on playout delays of previous packets than when the active detector detects the packet communication mode is the full-duplex mode.

13. The communications device of claim 10 wherein when the active detector detects the packet communication mode is the half-duplex mode, the playout controller calculates a playout delay for a current packet as depending less on an estimated network delay for the current packet than when the active detector detects the packet communication mode is the full-duplex mode.

14. The communications device of claim 10 further comprising:

a receiver through which the playout buffer receives packets from the network;

a media output device to which the playout buffer outputs packets;

a media input device for receiving packets; and a transmitter through which the playout device sends packets to the network.

15. The communications device of claim 10 wherein the media output device is a voice over Internet protocol (VoIP) player, videophone, on-line game, and other real-time interactive communication device.

16. The communications device of claim 10 wherein the network is a computer network or a radio transmission network for mobile phones.

* * * * *